United States Patent
Kral et al.

(10) Patent No.: US 10,942,855 B2
(45) Date of Patent: Mar. 9, 2021

(54) CONTEXTUAL LOADING BASED ON DYNAMIC CONTEXT

(71) Applicant: Microsoft Technology Licensing, LLC, Redmond, WA (US)

(72) Inventors: Kyle T. Kral, Redmond, WA (US); John C. Gordon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/356,751

(22) Filed: Mar. 18, 2019

(65) Prior Publication Data

US 2020/0301839 A1 Sep. 24, 2020

(51) Int. Cl.
| | | |
|---|---|---|
| G06F 15/173 | (2006.01) | |
| G06F 12/0862 | (2016.01) | |
| H04L 29/06 | (2006.01) | |
| H04L 29/08 | (2006.01) | |
| G06Q 10/10 | (2012.01) | |
| H04L 12/58 | (2006.01) | |

(52) U.S. Cl.
CPC .......... *G06F 12/0862* (2013.01); *H04L 63/08* (2013.01); *H04L 67/10* (2013.01); *H04L 67/24* (2013.01); *G06F 2212/1021* (2013.01); *G06F 2212/6024* (2013.01); *G06Q 10/1093* (2013.01); *H04L 51/22* (2013.01)

(58) Field of Classification Search
None
See application file for complete search history.

(56) References Cited

U.S. PATENT DOCUMENTS

| | | | | |
|---|---|---|---|---|
| 2014/0040977 | A1* | 2/2014 | Barton | H04W 12/0027 |
| | | | | 726/1 |
| 2014/0109171 | A1* | 4/2014 | Barton | H04L 63/0272 |
| | | | | 726/1 |
| 2015/0281111 | A1* | 10/2015 | Carl | H04L 47/70 |
| | | | | 709/226 |
| 2017/0180346 | A1 | 6/2017 | Suarez et al. | |
| 2017/0353496 | A1* | 12/2017 | Pai | H04L 63/1441 |
| 2018/0007059 | A1* | 1/2018 | Innes | H04L 63/107 |
| 2018/0246812 | A1* | 8/2018 | Aronovich | G06F 12/0871 |
| 2018/0247064 | A1* | 8/2018 | Aronovich | G06F 21/6209 |
| 2018/0314821 | A1 | 11/2018 | Brady et al. | |

(Continued)

OTHER PUBLICATIONS

Krsul, et al., "VMPlants: Providing and Managing Virtual Machine Execution Environments for Grid Computing", In Proceedings of the ACM/IEEE Conference on Supercomputing, Nov. 6, 2004, 12 pages.

(Continued)

*Primary Examiner* — Phyllis A Book

(74) *Attorney, Agent, or Firm* — Schwegman Lundberg & Woessner, P.A.

(57) ABSTRACT

A system for contextual loading of operating system is described. A context module forms a dynamic context of a user log in at a host. The context mapper identifies a container corresponding to the dynamic context and determines whether the container is present in a local container cache of the host. In response to the container being present in the local container cache, the container is presented at the host. In response to the container being absent from the local container cache, the container is retrieved from a container store and presented at the host.

18 Claims, 9 Drawing Sheets

(56) References Cited

U.S. PATENT DOCUMENTS

2018/0329733 A1* 11/2018 Aronov ................ G06F 9/5055
2019/0075130 A1* 3/2019 Petry ................... H04L 63/1483
2019/0102280 A1* 4/2019 Caldato ................ G06F 21/602
2019/0347121 A1* 11/2019 Luo ........................ G06F 9/542

OTHER PUBLICATIONS

"International Search Report and Written Opinion Issued in PCT Application No. PCT/US20/021930", dated Jul. 13, 2020, 12 pages.

* cited by examiner

CONTEXTUAL LOADING BASED ON DYNAMIC CONTEXT

TECHNICAL FIELD

The subject matter disclosed herein generally relates to a special-purpose machine that switch container being used by end user at a host based on dynamic context of the user at the host. Specifically, the present disclosure addresses systems and methods for accessing a locally cached container and a cloud container service based on the dynamic context.

BACKGROUND

Many times, a same physical hardware provides functionality across different user contexts. For instance, a mobile computing device may be used to for work and for personal use. For example, the same device can be used to correspond with work emails while simultaneously running leisure (or non-work related) applications. This creates a problem when various contexts (groups, workloads, data sets) require additional constraints (e.g., device must be locked, pin requirements, remotely wipeable by the organization). There is an innate overlap in the contexts that makes it impossible to affect one without the others. For instance, remote wiping a device that include work emails also remotely wipes things non work-related emails.

Additionally, as operating system (OS) features grow more and more dynamic and exclusive, the devices may be optimized for use in specific situations or contexts. For example, a device may be optimized to be used for conference meeting situations. Furthermore, the OS behaviors may be different from the ground-up that it would be difficult to contain a non-trivial number of these tailored experiences in the same OS running the same kernel all the time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
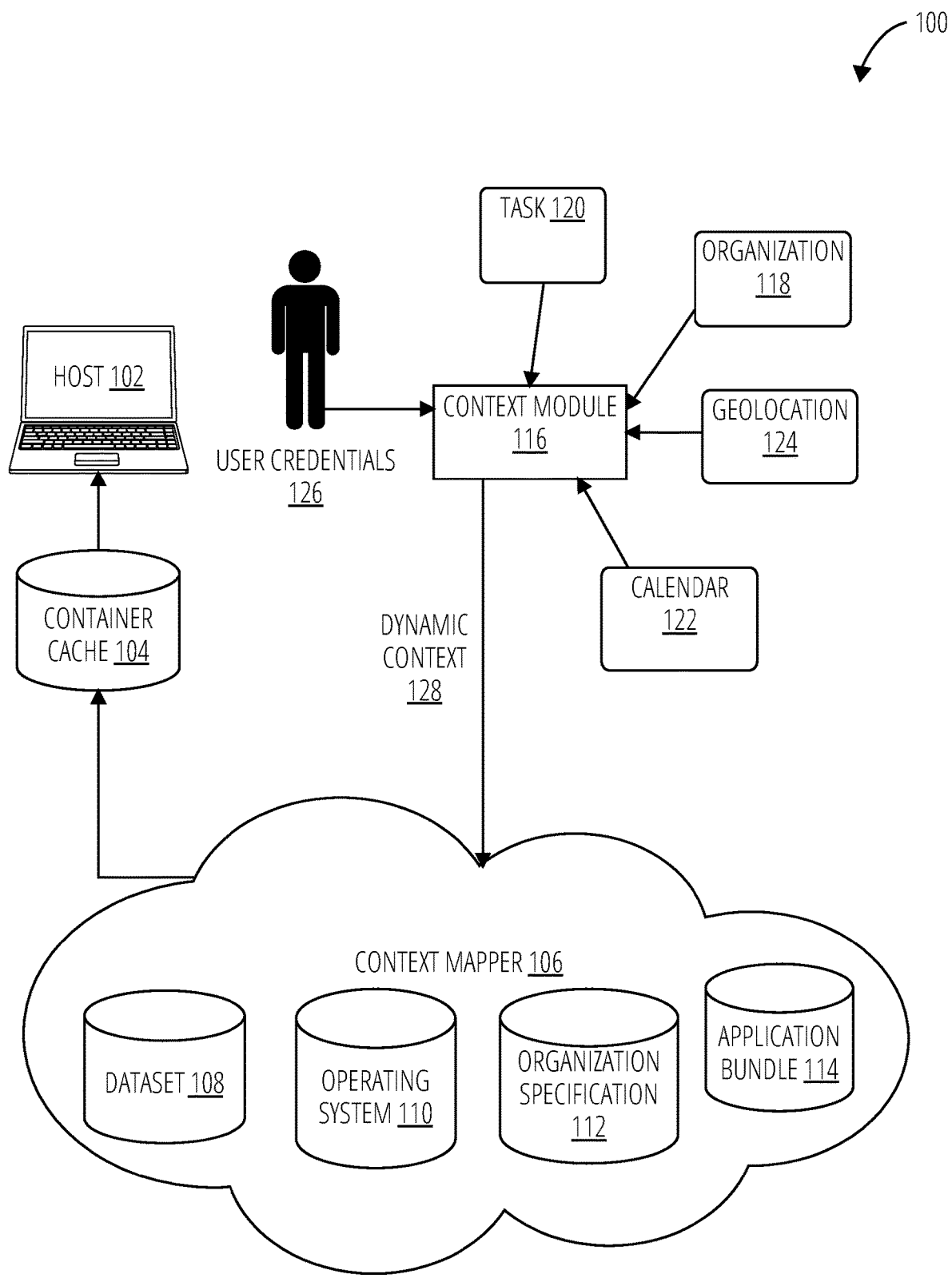
FIG. 1 is a block diagram illustrating a network environment in accordance with one embodiment.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Container" refers to a set of resources that operates on an operating system (or a guest operating system) to provide operations defined by a corresponding container image. Containers can run inside of VMs. Such operation can create a host with multiple OSs supporting multiple containers. The containers can thus share the physical resources without dependence on other applications using the OS.

"Cloud" refers to a global network of servers that are accessible through the Internet and provides a variety of hardware and software services. These servers are designed to either store and manage data, run applications, or deliver content or a service. Services can include streaming videos, web mail, office productivity software, or social media, among others. Instead of accessing files and data from a local or personal computer, Cloud data is accessed online from an Internet-capable device.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

When a user logs in at a host, a context module operating at the host generates a dynamic context, based on several factors (e.g., user credentials, geolocation, time of day, organization, user task). The context module running in the operating system at the host locally collects the dynamic context. The dynamic context can be used as a key to identify locally cached containers at the host.

If no containers are found in the local cache, the host passes the dynamic context passed through to the cloud container service to acquire a container suitable for the user scenario as specified in the dynamic context.

The container service contains a context mapper that operates on inputs provided by multiple sources. For example, a group policy may be in effect for the credential the end-user is trying to use to authenticate. In that case, a suitable container would be one with an OS that can enforce the group policy, and a configuration that specifies the group policy should be enforced.

In another example, the user may log in with their own personal identity. Applications may be loaded from a saved configuration consisting of the user's installed applications on the device at hand.

In another example, the user may take their device to a physical location with an expected set of capabilities. For instance, the user may bring a device to a meeting room. In the meeting room, the device may behave as a shared computing device with minimal local storage and use of identity. However, as the device leaves the room, the device may revert to a personal device experience.

The dynamic context enables the host to provide completely different user experiences and operating systems that focus on a tailored need. The present application describes using a meta-context (e.g., the container host OS) to context switch quickly and easily between native contexts without allowing them to affect each-other.

In one example embodiment, a system for contextual loading of operating system is described. A context module forms a dynamic context of a user log in at a host. The context mapper identifies a container corresponding to the dynamic context and determines whether the container is present in a local container cache of the host. In response to the container being present in the local container cache, the container is presented at the host. In response to the container being absent from the local container cache, the container is retrieved from a container store and presented at the host.

As a result, one or more of the methodologies described herein facilitate solving the technical problem of switching. As such, one or more of the methodologies described herein may obviate a need for certain efforts or computing resources that otherwise would be involved in overlapping contexts where one context with constraints affects another context with other constraints. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating a network environment 100 in accordance with one embodiment. A context module 116 forms a dynamic context 128 based on several factors: user credentials 126, task 120, organization 118, geolocation 124, calendar 122. For example, the user credentials 126 identifies the privileges and rights of the user. The task 120 identifies the task being performed by the user (e.g., playing with a leisure application). The organization 118 identifies an organization based on the user credentials 126 (e.g., school, work, personal).

The geolocation 124 identifies the geographic location of the host 102. For example, the geolocation 124 includes GPS information that indicates that the user is logged in at a particular location (e.g., a conference room, a classroom, or a building). The calendar 122 identifies a time of day (that the user is logged in) and scheduling information (e.g., appointments) for that user (e.g., user logged on a Monday morning, and has a team meeting on calendar). The context module 116 may also use other factors such as intentional user selection of scenario or workflow (e.g., an explicit selection by the user who choose "work time" or "party time") or nearby devices (e.g., using non-GPS signal such as Wi-Fi, Bluetooth, NFC). For example, if a device is proximal to other devices in a building, the domain could choose to reuse a single container for all nearby devices to facilitate interactions between the devices.

The context module 116 provides the dynamic context 128 to the context mapper 106. The context mapper 106 includes dataset 108, operating system 110, organization specification 112, application bundle 114. For example, the dataset 108 includes different datasets (e.g., dataset A, dataset B, dataset C . . . ). The operating system 110 includes different operating systems (e.g., OS facility A, OS facility B, OS facility C . . . ). The organization specification 112 includes different organization specifications (e.g., organization specification A, organization specification B, organization specification C . . . ). The application bundle 114 includes different application bundles (e.g., application bundle A, application bundle B, application bundle C . . . ). The context mapper 106 builds a personalized container based on constraints identified in the dynamic context 128. The container cache 104 stores the personalized container. In one example embodiment, the container cache 104 is configured to store several containers. The host 102 accesses one or more containers from the container cache 104. In one example embodiment, the host 102 redirects write operations to persistent data stores within the container to appropriate cloud datasets based on the identity used within the container.

Figure 2:
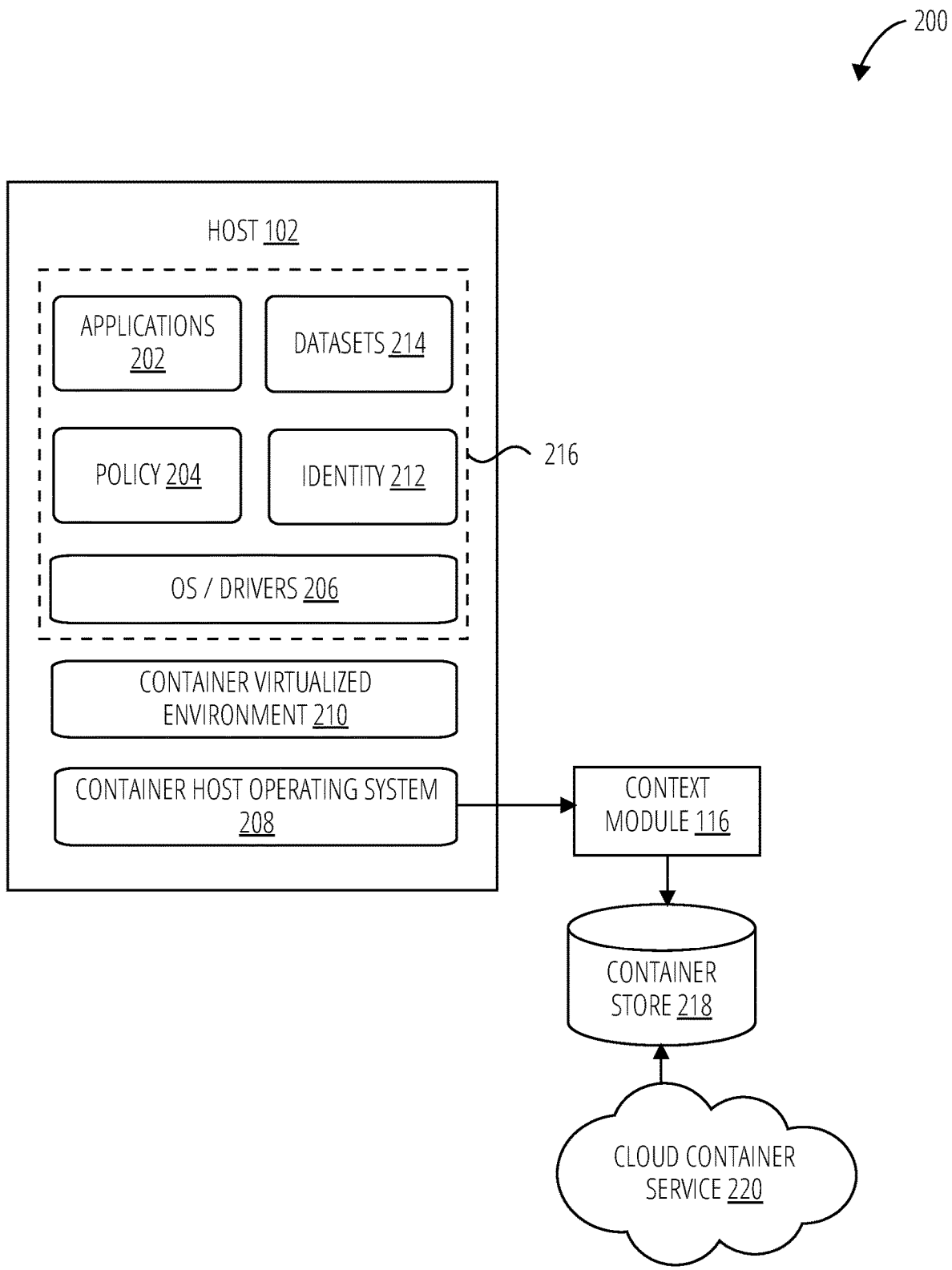
FIG. 2 is a block diagram illustrating a network environment in accordance with one embodiment.

FIG. 2 is a block diagram illustrating a network environment 200 in accordance with one embodiment. The network environment 200 comprises a host 102, a context module 116, a container store 218, and a cloud container service 220.

The host 102 generates experience 216 based on a container operating at the host 102. The experience 216 is formed based on the applications 202, the datasets 214, the policy 204, the identity 212, and the OS/drivers 206. The host 102 also includes container virtualized environment 210 and container host operating system 208. The container virtualized environment 210 forms the experience 216 based on the container identified in the container host operating system 208.

The container host operating system 208 allows the host 102 to context switch quickly and easily between native contexts without allowing them to affect each-other. The context module 116 determines the dynamic context 128 based on the factors described above with respect to FIG. 1. The container store 218 stores a library of containers from a cloud container service 220. In one example, the container store 218 identifies containers and corresponding context parameters from the context module 116.

Figure 3:
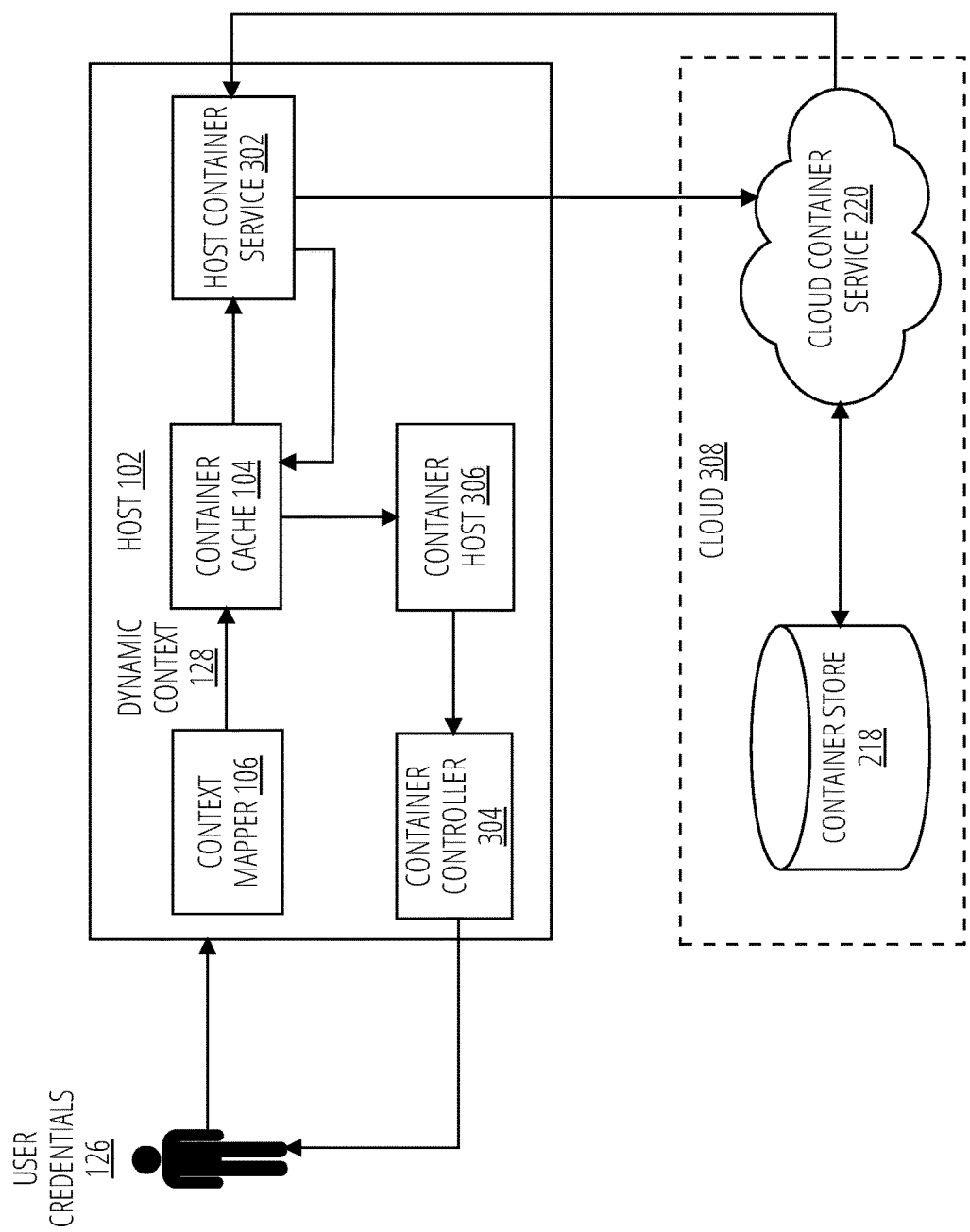
FIG. 3 is a block diagram illustrating a network environment in accordance with one embodiment.

FIG. 3 is a block diagram illustrating a network environment in accordance with one embodiment. A user logs in at host 102 with user credentials 126. The context mapper 106 determines a local context and builds a dynamic context 128 in response to the user logging in. In one example embodiment, the context mapper 106 determines the dynamic context 128 based on the user credentials 126 and a geolocation of the authentication. For example, the geolocation may indicate that the authentication near a particular meeting room. After the context mapper 106 has constructed the dynamic context, the context mapper 106 sends the dynamic context 128 to the (local) container cache 104 to determine whether there is an available container to fulfill the context from the dynamic context 128. If a local container is already cached in the container cache 104, the container host 306 retrieves that local cached container from container cache 104.

If no local container is cached in the container cache 104 (to fulfill the context provided), the container cache 104 signals host container service 302 to retrieve a new container. In one example embodiment, the host container service 302 signals the (domain) container store 218 and the cloud container service 220 (with provided context) and request for a new container to fulfill the given context. The container store 218 has several options to retrieve a container for the context provided:

1. return a completely preconfigured container that was created by the domain administrator to fulfill the exact context specified; the cloud container service 220 returns the preconfigured container to the host container service 302.
2. create a new container specification based from a base template container that was configured by the domain administrator; the cloud container service 220 returns the new container to the host container service 302. The new container specification can additionally be cached in the domain (e.g., cloud 308) to service future similar requests.

In another example embodiment, if a single container cannot be created to fulfill the context request (or multiple lightweight containers can be employed), the cloud container service 220 could return a set of containers to the host container service 302.

After construction or retrieval of a container(s) based on the provided context, the cloud container service 220 returns the container(s) to the host container service 302 running locally on the host 102. The host container service 302 places the container(s) in the container cache 104 of the host 102. These containers can be reused later to fulfill the context in the future. The state of the container could be preserved locally in the local container cache 104 or it could be preserved remotely in the cloud container store 218 (configured by the administrator), such that a stateful container could be shared across multiple user contexts.

The container host 306 loads the identified container to be used for fulfilling the dynamic context from the container cache 104. The container controller 304 determines how to present that container to the user, and what type of container is being used (e.g. a lightweight shared kernel container, or a full VM experience, or multiple containers). For example, the container controller 304 presents a container to the user in the form of:

For a light weight shared multiple container experience: the containers could be visually hosted in the same experience for that user such that there is no distinction between the multiple containers in use—only a single shared visual OS experience.

For a heavy weight single full VM container: the entire visual OS experience is replaced by that single container experience.

Figure 4:
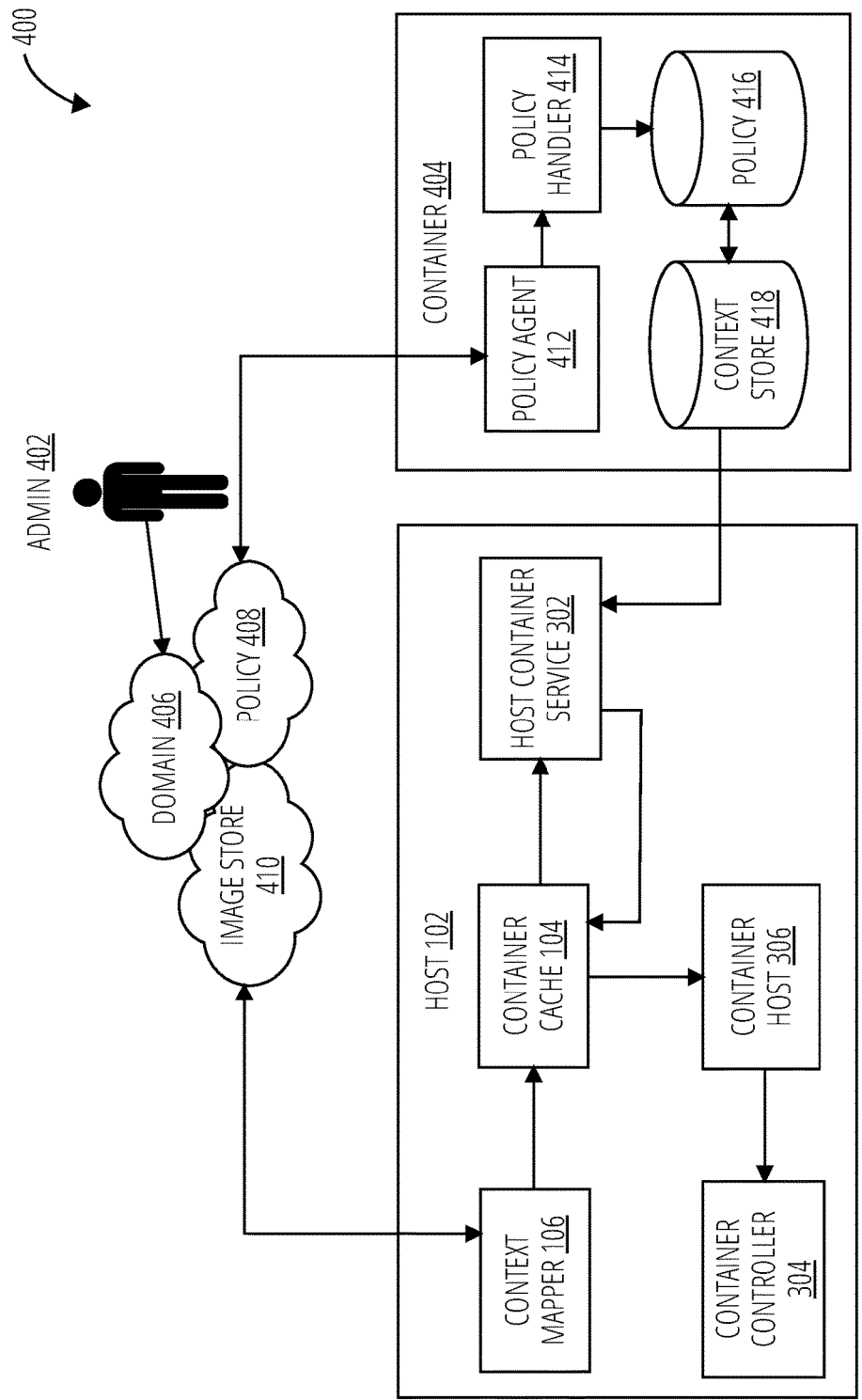
FIG. 4 is a block diagram illustrating a network environment in accordance with one embodiment.

FIG. 4 is a block diagram illustrating network environment 400 in accordance with one embodiment. The network environment 400 comprises a domain 406, a container 404, and a host 102. The domain 406 includes image store 410 and a new policy 408. The container 404 includes policy agent 412, policy handler 414, policy 416, and context store 418. The host 102 includes context mapper 106, container cache 104, host container service 302, container host 306, and container controller 304.

The policy agent 412 in the hosted container 404 retrieves a new policy 408 from the domain 406. The policy agent 412 loads the associated policy handler 414 to interpret the policy 408 retrieved from the domain 406. The policy handler 414 detects that it is running in container 404 and calls an API to check to see if the policy change should be executed locally.

On the host 102, the context mapper 106 receives the query from the policy handler 414 in the container 404. The context mapper 106 evaluates the whole property set for the container 404 making the query, with the proposed change applied.

The context mapper 106 forwards the property set to the image store 410 of the domain 406. If an image is found, the context mapper 106 adds a new entry to the host's image cache with the policy applied. The existing image is suspended, and still holds the execution context from before policy was applied. The new image is run.

If an image is not found, the current running image state is saved with current policy settings, the host 102 returns "true" to the container OS indicating that it should change the policy. The newly running instance is now saved in the container cache 104 with the changed policy value.

In another example embodiment, the containers can be layered: applying a container may refer to downloading a whole virtual machine, or it could patch some files. In the case where the host 102 and client share an OS, it is possible to template the containers from the host 102 and simply record moments of divergence to deliver a kind of timeline that people could use to switch contexts fluidly.

Figure 5:
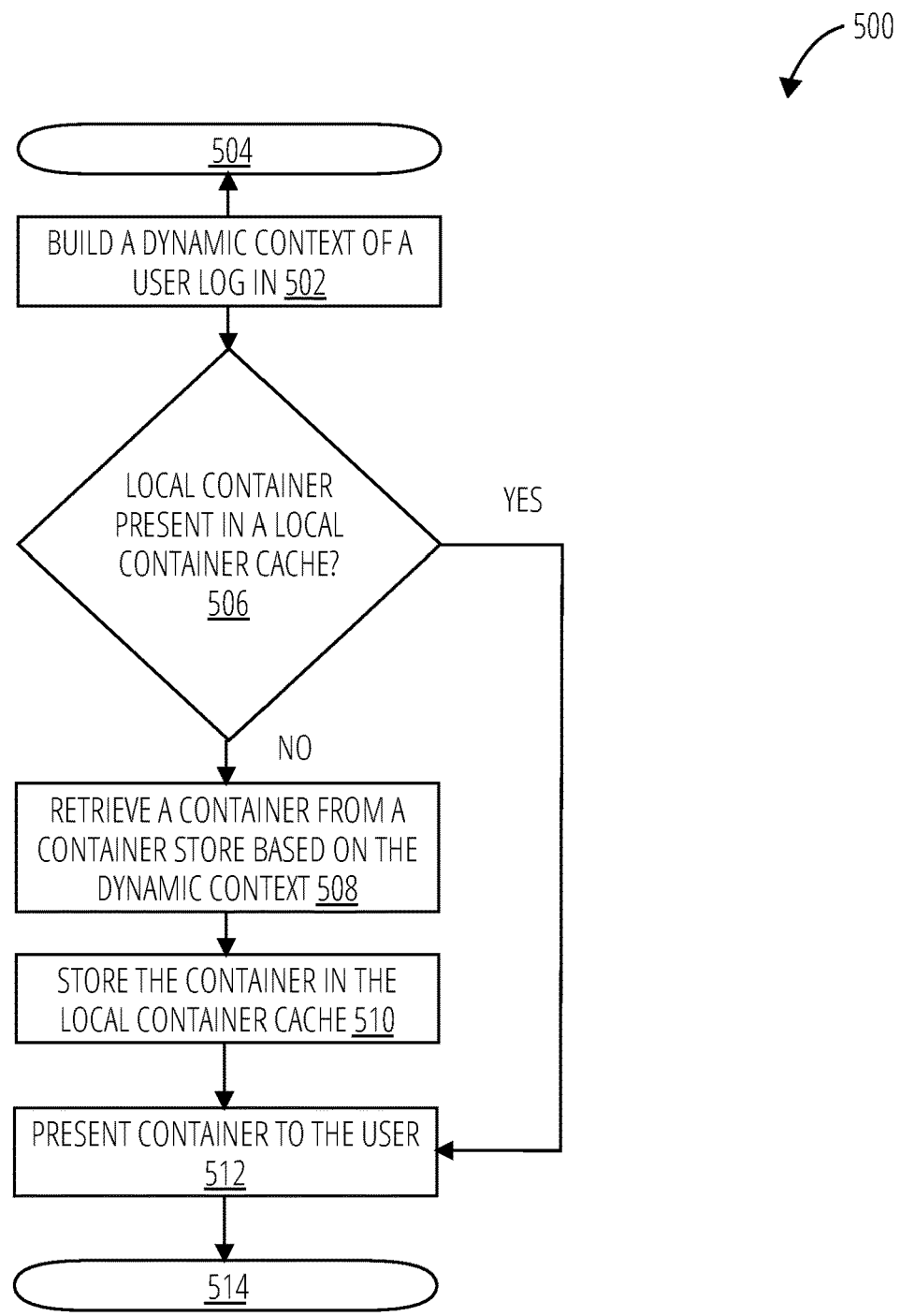
FIG. 5 illustrates a flow diagram in accordance with one example embodiment.

FIG. 5 illustrates a flow diagram 500 in accordance with one example embodiment. Operations in the flow diagram 500 may be performed by the context mapper 106 using components (e.g., modules, engines) described above with respect to FIG. 3. Accordingly, the flow diagram 500 is described by way of example with reference to the context mapper 106. However, it shall be appreciated that at least some of the operations of the flow diagram 500 may be deployed on various other hardware configurations or be performed by similar components residing elsewhere. For example, some of the operations may be performed at the cloud 308.

At block 502, context module 116 (or the context mapper 106) builds a dynamic context 128 of a user log in. At decision block 506, the host 102 determines whether a local container is present in the local container cache 104. If no containers are being locally cached, the host container service 302 retrieves a container from a container store based on the dynamic context at block 508. At block 510, the host container service 302 stores the retrieved container in the container cache 104. At block 512, the container controller 304 presents the container to the user.

Figure 6:
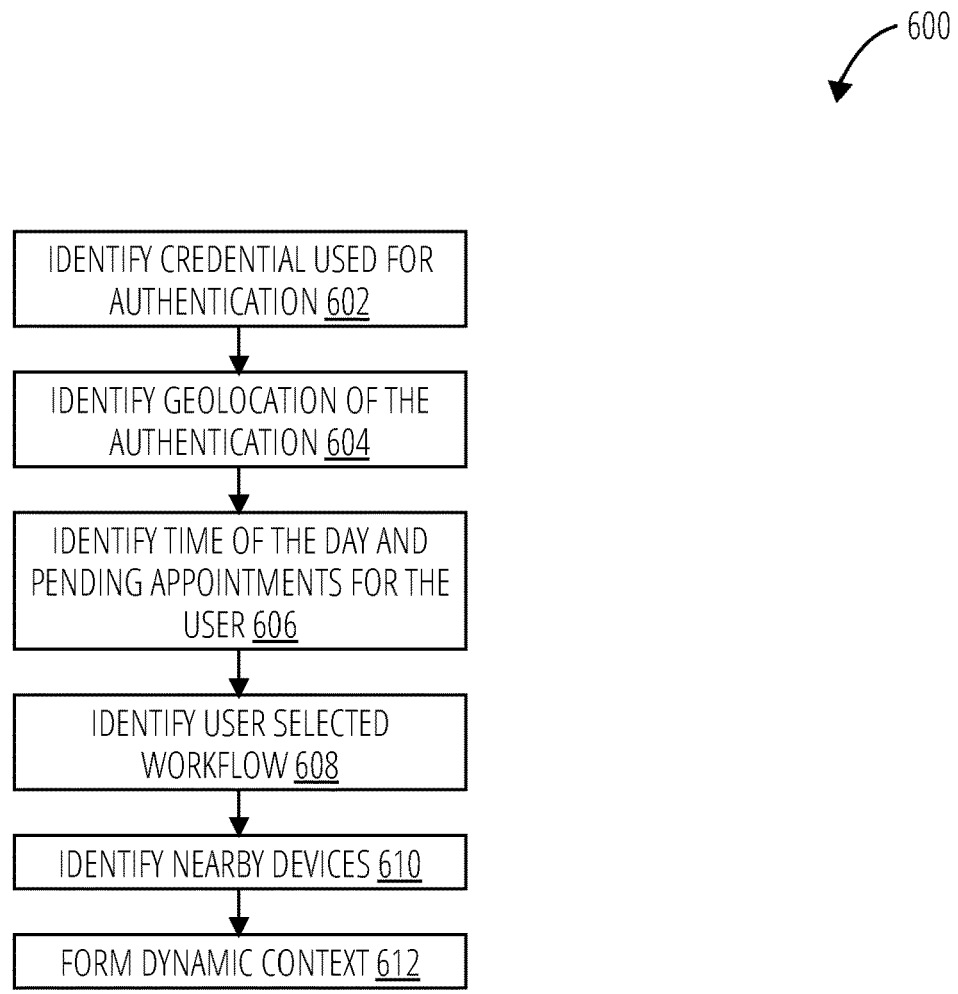
FIG. 6 illustrates a flow diagram in accordance with one example embodiment.

FIG. 6 illustrates a flow diagram 600 in accordance with one example embodiment. Operations in the flow diagram 500 may be performed by the context mapper 106 using components (e.g., modules, engines) described above with respect to FIG. 3. Accordingly, the flow diagram 500 is described by way of example with reference to the context mapper 106. However, it shall be appreciated that at least some of the operations of the flow diagram 500 may be deployed on various other hardware configurations or be performed by similar components residing elsewhere. For example, some of the operations may be performed at the cloud 308.

At block 602, the context module 116 identifies credentials user for authentication. At block 604, the context module 116 identifies a geolocation of the authentication. At block 606, the context module 116 identifies a time of the day and pending appointments for the user. At block 608, the context module 116 identifies a user selected workflow. At block 610, the context module 116 identifies nearby devices. At block 612, the context module 116 forms a dynamic context 128 based on a combination of the user credentials for authentication, the geolocation of the authentication, the time of the day and pending appointments for the user, the user selected workflow, and nearby devices.

Figure 7:
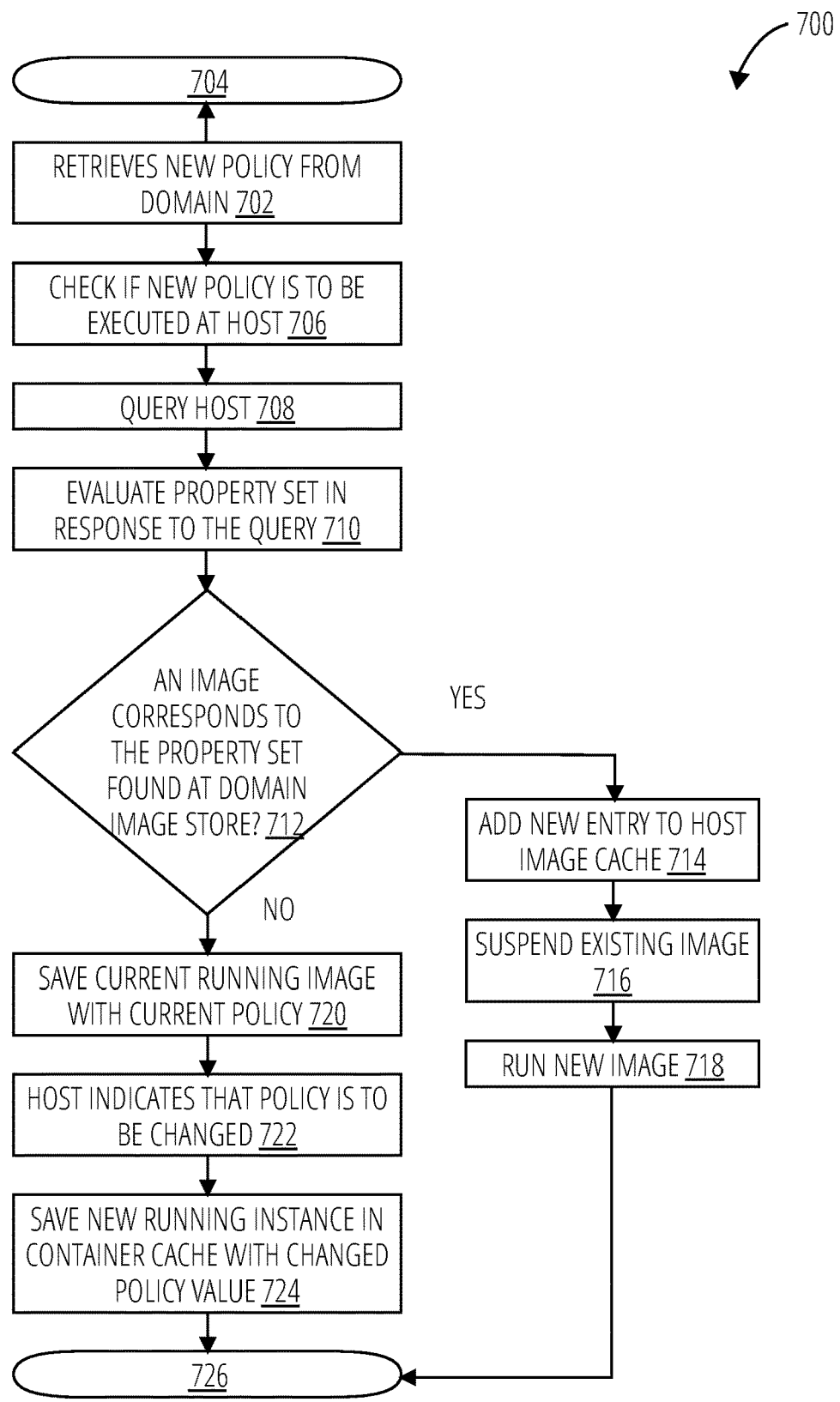
FIG. 7 illustrates a flow diagram in accordance with one example embodiment.
Figure 8:
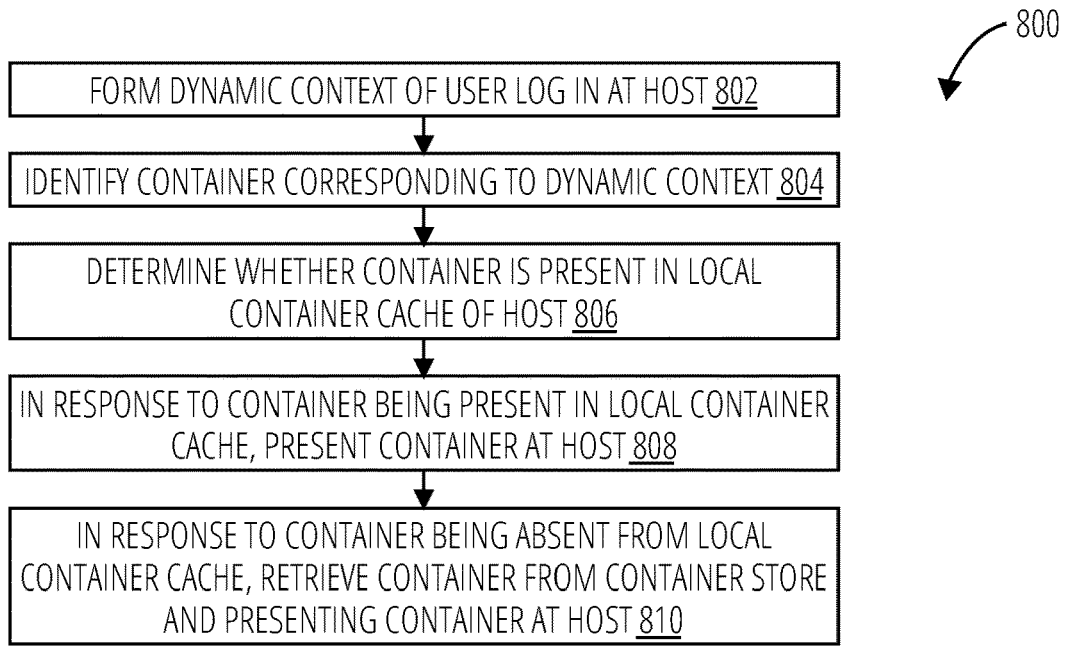
FIG. 8 illustrates a routine in accordance with one embodiment.

FIG. 7 illustrates a flow diagram 700 in accordance with one example embodiment. Operations in the flow diagram 500 may be performed by the context mapper 106 using components (e.g., modules, engines) described above with respect to FIG. 3. Accordingly, the flow diagram 500 is described by way of example with reference to the context mapper 106. However, it shall be appreciated that at least some of the operations of the flow diagram 500 may be deployed on various other hardware configurations or be performed by similar components residing elsewhere. For example, some of the operations may be performed at the cloud 308.

At block 702, a new policy is retrieved from the domain 406. At block 706, a local container checks if the new policy is to be executed at the host 102. At block 708, the local container queries the host 102. At block 710, the local container evaluates property set in response to the query. At decision block 712, the local container determines whether an image corresponds to the property set found at the domain image store 410. If the image is found, a new entry is added to the host image cache at block 714. The local container suspends the existing image at block 716 and runs the new image at block 718.

if no image is found, the current running image with the current policy is saved. At block 722, the host 102 indicates that the policy is to be changed. At block 724, the host 102 saves the new running instance in the container cache 104 with the changed policy value.

In block 802, routine 800 forms a dynamic context of a user log in at a host. In block 804, routine 800 identifies a container corresponding to the dynamic context. In block 806, routine 800 determines whether the container is present in a local container cache of the host. In block 808, routine 800 in response to the container being present in the local container cache, presents the container at the host. In block 810, routine 800 in response to the container being absent from the local container cache, retrieves the container from a container store and presenting the container at the host.

Figure 9:
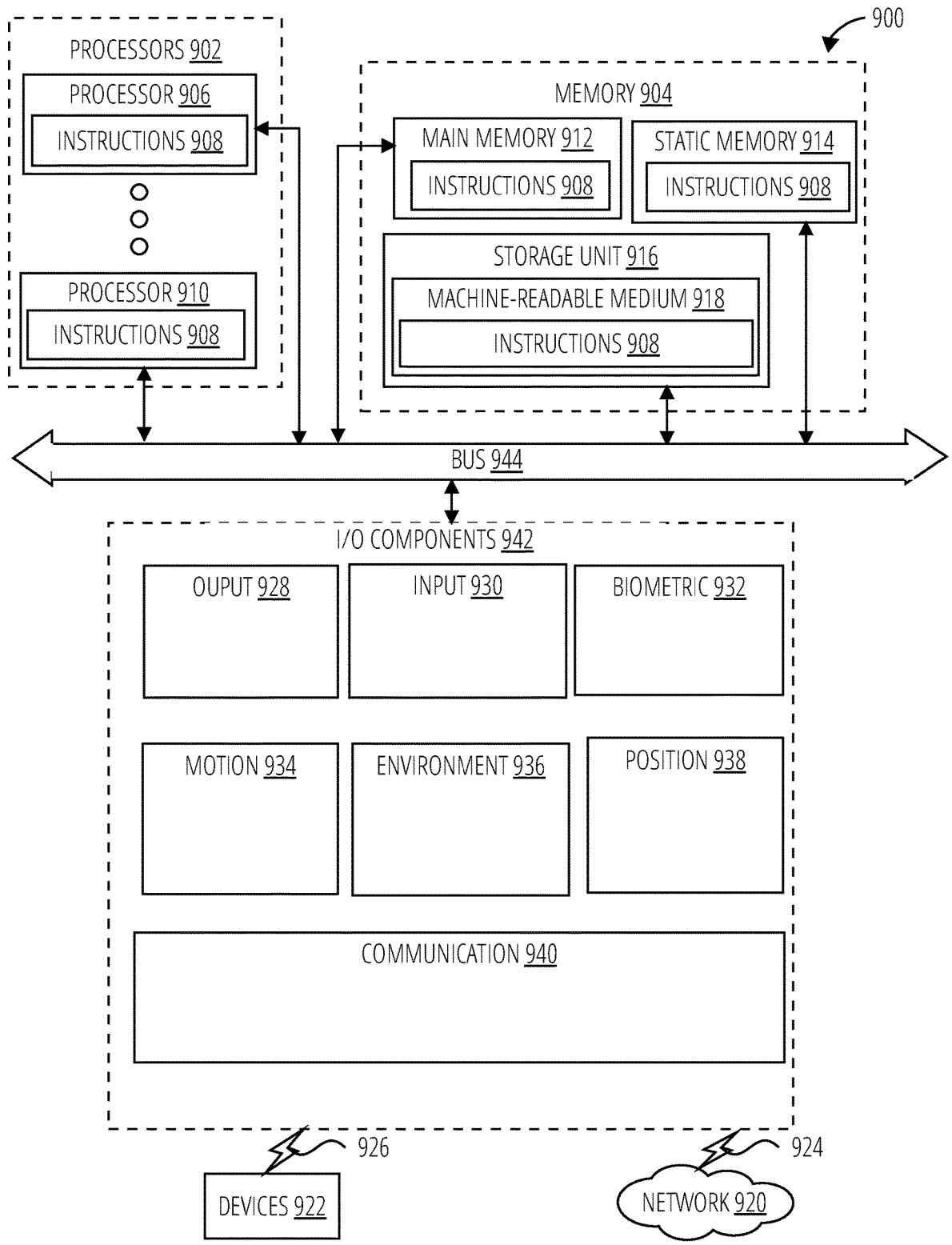
FIG. 9 is a diagrammatic representation of a machine in the form of a computer system within which a set of instructions may be executed for causing the machine to perform any one or more of the methodologies discussed herein, according to an example embodiment.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908.

The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various example embodiments, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the processors 902) and/or storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Examples

Example 1 is a computer-implemented method comprising: forming a dynamic context of a user log in at a host; identifying a container corresponding to the dynamic context; determining whether the container is present in a local container cache of the host; in response to the container being present in the local container cache, presenting the container at the host; and in response to the container being absent from the local container cache, retrieving the container from a container store and presenting the container at the host.

In example 2, the subject matter of example 1 can optionally include: wherein forming the dynamic context further comprises: identifying a user credential used for authentication for the user log in; identifying a geolocation of the host at the user log in; identifying a time of day and scheduling items on a calendar of a user of the user log in; identifying a user-selected workflow that indicates a user intentional scenario;

identifying a nearby device within a preset distance range of the host; and forming the dynamic context based on a combination of the user credential, the geolocation of the host, the time of day and scheduling items, the user-selected workflow, the nearby device.

In example 3, the subject matter of example 1 can optionally include: in response to the container being absent from the local container cache, providing the dynamic context to the container store, the container store configured to identify a preconfigured container corresponding to the dynamic context, the container comprising the preconfigured container; and storing the container in the local container cache.

In example 4, the subject matter of example 1 can optionally include: in response to the container being absent from the local container cache, providing the dynamic context to the container store, the container store configured to form the container based on a base template container; and storing the container in the local container cache.

In example 5, the subject matter of example 1 can optionally include: in response to the container being absent from the local container cache, providing the dynamic context to the container store, the container store configured to identify a set of lightweight containers based on the dynamic context, the container comprising the set of lightweight containers; and storing the container in the local container cache.

In example 6, the subject matter of example 1 can optionally include: in response to the container being absent from the local container cache, storing the container in the local container cache or at the container store, the container being shared across multiple user contexts.

In example 7, the subject matter of example 1 can optionally include: wherein presenting the container at the host is based on a type of the container, the type of container comprising at least one of a lightweight shared kernel container, a virtual machine experience, and a plurality of containers.

In example 8, the subject matter of example 1 can optionally include: retrieving a new policy from a domain; querying the host for a property set of the container at the host; comparing the property set of the container with a property set of the new policy; and updating the container at the host based on the comparison.

In example 9, the subject matter of example 8 can optionally include: wherein comparing further comprises: determining whether an image store of the domain includes an image corresponding to the property set; and in response to determining that the image store includes the image corresponding to the property set, adding the image to an image cache at the host, suspending an existing image at the host, and running the image.

In example 10, the subject matter of example 8 can optionally include: wherein comparing further comprises: determining whether an image store of the domain includes an image corresponding to the property set; and in response to determining that the image store does not include the image corresponding to the property set, saving a current running image with current policy settings, confirming a change in the policy at the host, and saving the current running image with the change in the policy.

What is claimed is:

1. A computer-implemented method, comprising:
   forming a dynamic context of a user log in at a host;
   identifying a container corresponding to the dynamic context;
   determining whether the container is present in a local container cache of the host;
   in response to the container being present in the local container cache, presenting the container at the host;
   in response to the container being absent from the local container cache, retrieving the container from a container store and presenting the container at the host;
   retrieving a new policy from a domain;
   querying the host for a property set of the container at the host;
   comparing the property set of the container with a property set of the new policy; and
   updating the container at the host based on the comparison.

2. The computer-implemented method of claim 1, wherein forming the dynamic context further comprises:
   identifying a user credential used for authentication for the user log in;
   identifying a geolocation of the host at the user log in;
   identifying a time of day and scheduling items on a calendar of a user of the user log in;
   identifying a user-selected workflow that indicates a user intentional scenario;
   identifying a nearby device within a preset distance range of the host; and
   forming the dynamic context based on a combination of the user credential, the geolocation of the host, the time of day and scheduling items, the user-selected workflow, or the nearby device.

3. The computer-implemented method of claim 1, further comprising:
   in response to the container being absent from the local container cache, providing the dynamic context to the container store, the container store configured to identify a preconfigured container corresponding to the dynamic context, the container comprising the preconfigured container; and
   storing the container in the local container cache.

4. The computer-implemented method of claim 1, further comprising:
   in response to the container being absent from the local container cache, providing the dynamic context to the container store, the container store configured to form the container based on a base template container; and
   storing the container in the local container cache.

5. The computer-implemented method of claim 1, further comprising:
   in response to the container being absent from the local container cache, providing the dynamic context to the container store, the container store configured to identify a set of lightweight containers based on the dynamic context, the container comprising the set of lightweight containers; and
   storing the container in the local container cache.

6. The computer-implemented method of claim 1, further comprising:
   in response to the container being absent from the local container cache, storing the container in the local container cache or at the container store, the container being shared across multiple user contexts.

7. The computer-implemented method of claim 1, wherein presenting the container at the host is based on a type of the container, the type of container comprising at least one of a lightweight shared kernel container, a virtual machine experience, and a plurality of containers.

8. The computer-implemented method of claim 1, wherein comparing further comprises:
   determining whether an image store of the domain includes an image corresponding to the property set; and
   in response to determining that the image store includes the image corresponding to the property set, adding the image to an image cache at the host, suspending an existing image at the host, and running the image.

9. The computer-implemented method of claim 1, wherein comparing further comprises:
   determining whether an image store of the domain includes an image corresponding to the property set; and
   in response to determining that the image store does not include the image corresponding to the property set, saving a current running image with current policy settings, confirming a change in the policy at the host, and saving the current running image with the change in the policy.

10. A computing apparatus, the computing apparatus comprising:
    a processor; and
    a memory storing instructions that, when executed by the processor, configure the apparatus to perform operations comprising:
    form a dynamic context of a user log in at a host;
    identify a container corresponding to the dynamic context;
    determine whether the container is present in a local container cache of the host;
    in response to the container being present in the local container cache, present the container at the host;
    in response to the container being absent from the local container cache, retrieve the container from a container store and presenting the container at the host;
    retrieve a new policy from a domain;
    query the host for a property set of the container at the host;
    compare the property set of the container with a property set of the new policy; and
    update the container at the host based on the comparison.

11. The computing apparatus of claim 10, wherein forming the dynamic context further comprises:
    identify a user credential used for authentication for the user log in;
    identify a geolocation of the host at the user log in;
    identify a time of day and scheduling items on a calendar of a user of the user log in;
    identify a user-selected workflow that indicates a user intentional scenario;
    identify a nearby device within a preset distance range of the host; and
    form the dynamic context based on a combination of the user credential, the geolocation of the host, the time of day and scheduling items, the user-selected workflow, gr the nearby device.

12. The computing apparatus of claim 10, wherein the instructions further configure the apparatus to:
    in response to the container being absent from the local container cache, provide the dynamic context to the container store, the container store configured to identify a preconfigured container corresponding to the dynamic context, the container comprising the preconfigured container; and store the container in the local container cache.

13. The computing apparatus of claim 10, wherein the instructions further configure the apparatus to:

in response to the container being absent from the local container cache, provide the dynamic context to the container store, the container store configured to form the container based on a base template container; and store the container in the local container cache.

14. The computing apparatus of claim 10, wherein the instructions further configure the apparatus to:

in response to the container being absent from the local container cache, provide the dynamic context to the container store, the container store configured to identify a set of lightweight containers based on the dynamic context, the container comprising the set of lightweight containers; and store the container in the local container cache.

15. The computing apparatus of claim 10, wherein presenting the container at the host is based on a type of the container, the type of container comprising at least one of a lightweight shared kernel container, a virtual machine experience, and a plurality of containers.

16. The computing apparatus of claim 10, wherein comparing further comprises:

determine whether an image store of the domain includes an image corresponding to the property set; and in response to determining that the image store includes the image corresponding to the property set, add the image to an image cache at the host, suspending an existing image at the host, and running the image.

17. The computing apparatus of claim 10, wherein comparing further comprises:

determine whether an image store of the domain includes an image corresponding to the property set; and in response to determining that the image store does not include the image corresponding to the property set, save a current running image with current policy settings, confirming a change in the policy at the host, and saving the current running image with the change in the policy.

18. A non-transitory computer-readable storage medium, the computer-readable storage medium including instructions that when executed by a computer, cause the computer to perform operations comprising:

form a dynamic context of a user log in at a host;

identify a container corresponding to the dynamic context;

determine whether the container is present in a local container cache of the host;

in response to the container being present in the local container cache, present the container at the host;

in response to the container being absent from the local container cache, retrieve the container from a container store and presenting the container at the host;

retrieve a new policy from a domain;

query the host for a property set of the container at the host;

compare the property set of the container with a property set of the new policy; and update the container at the host based on the comparison.

* * * * *